(12) United States Patent
Lu et al.

(10) Patent No.: US 12,276,269 B2
(45) Date of Patent: Apr. 15, 2025

(54) INTEGRATED AIR SUPPLY UNIT

(71) Applicants: Weidong Lu, Los Altos, CA (US); Daisy Kwok, Los Altos, CA (US)

(72) Inventors: Weidong Lu, Los Altos, CA (US); Daisy Kwok, Los Altos, CA (US)

( * ) Notice: Subject to any disclaimer, the term of this patent is extended or adjusted under 35 U.S.C. 154(b) by 43 days.

(21) Appl. No.: 18/186,182

(22) Filed: Mar. 19, 2023

(65) Prior Publication Data
US 2024/0309860 A1 Sep. 19, 2024

(51) Int. Cl.
*F04B 35/04* (2006.01)
*F04B 53/16* (2006.01)

(52) U.S. Cl.
CPC .............. *F04B 35/04* (2013.01); *F04B 53/16* (2013.01)

(58) Field of Classification Search
CPC .................................. F04B 35/04; F04B 53/16
See application file for complete search history.

(56) References Cited

U.S. PATENT DOCUMENTS

| | | | |
|---|---|---|---|
| 5,600,953 A | 2/1997 | Oshita et al. | |
| 6,726,189 B2 | 4/2004 | Folchert et al. | |
| 10,391,830 B2 | 8/2019 | Bohn et al. | |
| 2010/0206168 A1* | 8/2010 | Honjo | B01D 53/261 96/118 |
| 2010/0270760 A1* | 10/2010 | Lloyd | B60G 17/0523 280/5.514 |
| 2012/0193845 A1* | 8/2012 | Yamanaka | F04B 39/066 417/415 |
| 2013/0257007 A1* | 10/2013 | Frank | B60G 17/0525 280/124.161 |
| 2014/0373718 A1* | 12/2014 | Bergemann | B60G 17/0408 96/118 |
| 2016/0001624 A1* | 1/2016 | Meissner | F04B 27/04 280/124.16 |
| 2017/0036505 A1* | 2/2017 | Bohn | B60G 17/056 |
| 2018/0015803 A1 | 1/2018 | Harada et al. | |
| 2019/0003470 A1* | 1/2019 | Kawai | F04B 35/045 |
| 2019/0032647 A1* | 1/2019 | Bredbeck | F04B 39/0022 |
| 2019/0070553 A1* | 3/2019 | Oishi | B60G 17/052 |
| 2020/0269645 A1 | 8/2020 | Reuter, II et al. | |
| 2020/0378377 A1* | 12/2020 | Kirchhoff | H02K 7/02 |
| 2021/0348601 A1 | 11/2021 | Harada et al. | |

(Continued)

FOREIGN PATENT DOCUMENTS

| | | |
|---|---|---|
| CN | 208123025 U | 11/2018 |
| DE | 10243895 A1 | 4/2004 |
| DE | 102008034240 B4 | 1/2010 |

(Continued)

OTHER PUBLICATIONS

Japanese patent office action dated Apr. 3, 2024 for Patent application 2023-098223.

(Continued)

*Primary Examiner* — Thomas Fink
(74) *Attorney, Agent, or Firm* — Frank Gao, Esq.

(57) ABSTRACT

The patent application discloses a compressed air control device. The compressed air control device for a source of compressed air on motor vehicles may comprise a housing. The housing may include an air inlet opening located at an outside surface of the housing. The housing comprises an electric motor and an air dryer. The air dryer together with the electric motor forms a first functional unit.

10 Claims, 9 Drawing Sheets

(56) References Cited

U.S. PATENT DOCUMENTS

2023/0122679 A1   4/2023 Reuter et al.

FOREIGN PATENT DOCUMENTS

| | | | |
|---|---|---|---|
| DE | 102010036742 A1 * | 2/2012 | ........... B01D 53/261 |
| DE | 102015219613 A1 | 4/2017 | |
| DE | 102019210810 A1 | 1/2021 | |
| EP | 3683072 A | 7/2020 | |
| JP | 2003286956 A | 10/2003 | |
| JP | 2009085103 A | 4/2009 | |

OTHER PUBLICATIONS

European patent partial search report Apr. 4, 2024 for EP patent application 23179622.8.
Japanese patent notice to grant dated Aug. 20, 2024 for Patent application 2023-098223.
EP search report and written opinion for EP23179631.9, mailed on Dec. 13, 2024.

* cited by examiner

INTEGRATED AIR SUPPLY UNIT

TECHNICAL FIELD

The present invention relates to an air supply unit of a motor vehicle air suspension system, and in particular relates to an integrated air supply unit.

BACKGROUND

Motor vehicle compressor units, in general, are arranged, for example, in the region below the vehicle's luggage compartment, and provide compressed air, for example, for a level control system of the vehicle's air suspension system. The air suspension can adjust the stiffness and damping of the vehicle suspension in real time according to the movement of the motor vehicle and the road surface conditions in such a way that the suspension system is in the best shock absorption state and the vehicle can provide a good comfort for users in various road conditions. As the core component of the air suspension system, the air supply unit compresses air and injects it into the air spring, which provides the power to realize the function of adjusting the stiffness and damping of the air suspension.

It is known in the air supply equipment used in the air suspension system of motor vehicles, a single-stage compression method (with a pressure stage) is commonly applied as a compressor solution. Although this compressor has a large output gas volume, the output gas pressure is low, thus resulting in low adjustment sensitivity of the automotive air suspension system.

Therefore, there is a need to have a better and efficient compressed air control device with a high pressure air output.

SUMMARY

In one aspect, one embodiment discloses a compressed air control device for a source of compressed air on motor vehicles. The compressed air control device may comprise a housing. The housing may include an air inlet with an opening located at an outside surface of the housing. The housing may comprise an electric motor and an air dryer. The air dryer together with the electric motor may form a first functional unit. Optionally in any aspect, the compressed air control device may further comprise a crank case.

Optionally in any aspect, the crank case may further comprise an air compressor.

Optionally in any aspect, the compressed air control device may further comprise a second functional unit wherein the second functional unit comprises a plurality of valve assembly and an electronic control device.

Optionally in any aspect, the second functional unit may be removably attached to the crank case.

Optionally in any aspect, the first functional unit is attached to the crank case away from the air inlet opening.

Optionally in any aspect, the plurality of valve assembly comprises a plurality of pneumatic valves.

Optionally in any aspect, the air compressor may be driven by way of the electric motor.

Optionally in any aspect, the air compressor is embodied as a two-piston compressor.

Optionally in any aspect, the two-piston compressor is mounted centrally by way of a crankpin.

Optionally in any aspect, the electronic control device comprises an electronic connector.

Optionally in any aspect, the compressed air control device is assembled on a vehicle.

In further another aspect, one embodiment discloses a method for designing a more efficient reciprocating piston compressor. The method may comprise steps of providing an air compressor having a first compression stage adapted for compressing gas from a low pressure to an intermediate pressure and including a first piston connected to reciprocate in a first cylinder, a second compression stage adapted for compressing gas from the intermediate pressure to a higher pressure and including a second piston connected to reciprocate in a second cylinder, and a motor connected to reciprocate said first piston in said first cylinder over a stroke and said second piston in said second cylinder over a stroke; and establishing a sufficiently fewer number of strokes over which the gas to be pressed starting from the atmosphere pressure.

Optionally in any aspect, the method further comprises pumping gas from a pressured container for the first compression stage.

Optionally in any aspect, the step may further comprise steps of mixing the atmosphere air with the gas pumped from the pressured container.

Optionally in any aspect, the step may further comprise comprising pumping gas from a pressured container for the second compression stage.

Optionally in any aspect, the step may further comprise diverting a part of the gas pumped from the pressured container to atmosphere if the pressure is higher than a set pressure.

Optionally in any aspect, the step may further comprise diverting a part of the pressured gas after the first stage to atmosphere.

Optionally in any aspect, the step may further comprise drying the pressured gas after the second compression stage.

Optionally in any aspect, the step may further comprise monitoring the pressure of the pressured gas by using a pressure sensor.

Optionally in any aspect, the step may further comprise transferring the dried pressed gas to a pressured container for storage.

Optionally in any aspect, the step may further comprise transferring the dried pressured gas to air spring of a suspension system of a vehicle.

Optionally in any aspect, the step may further comprise regulating the dried pressed gas by a solenoid valve before transferring to the air spring.

In still further another aspect, one embodiment discloses a compressed air control device comprises a housing and a crank case. The housing includes an air inlet with an opening located at an outside surface of the housing. The crank case comprises an air compressor. The first functional unit may be attached to and connected to the crank case away from the air inlet opening.

In still further another aspect, one embodiment discloses a compressed air control device comprises a crank case, a housing, and a second functional unit. The crank case comprises an air compressor. The housing has an electric motor and forms a first function unit. The housing is attached to the crank case. The second function unit may comprise a valve assembly and an electronic control device. The second function unit may be removably attached and connected to the crank case.

BRIEF DESCRIPTION OF THE DRAWINGS

In order to illustrate the technical solutions more clearly in the embodiments of the present disclosure or the exemplary techniques, the drawings to be used in the embodiments or the description of the exemplary embodiments will be briefly described below. Obviously, the drawings in the following description are only certain embodiments of the present disclosure, and other drawings may be obtained according to the structures shown in the drawings without any creative work for those skilled in the art.

The implementation, functional features and advantages of the present disclosure will be further described with reference to the accompanying drawings.

DETAILED EMBODIMENTS

Definitions

The invention is not limited to the particular methodology, protocols, and reagents described herein because they may vary. Further, the terminology used herein is for the purpose of describing particular embodiments only and is not intended to limit the scope of the present invention. As used herein and in the appended claims, the singular forms "a," "an," and "the" include plural reference unless the context clearly dictates otherwise.

Unless defined otherwise, all technical and scientific terms and any acronyms used herein have the same meanings as commonly understood by one of ordinary skill in the art in the field of the invention. Although any methods and materials similar or equivalent to those described herein can be used in the practice of the present invention, the preferred methods, devices, and materials are described herein. The technical means, creative features, objectives, and effects of the patent application may be easy to understand, the following embodiments will further illustrate the patent application. However, the following embodiments are only the preferred embodiments of the utility patent application, not all of them. Based on the examples in the implementation manners, other examples obtained by those skilled in the art without creative work shall fall within the protection scope of the present invention. The experimental methods in the following examples are conventional methods unless otherwise specified. The materials used in the following examples can be obtained from commercial sources unless otherwise specified.

THE EMBODIMENTS

Embodiments of the present invention are directed to compressed air control device for a source of compressed air on motor vehicles, and method for designing a more efficient reciprocating piston compressor.

Figure 1:
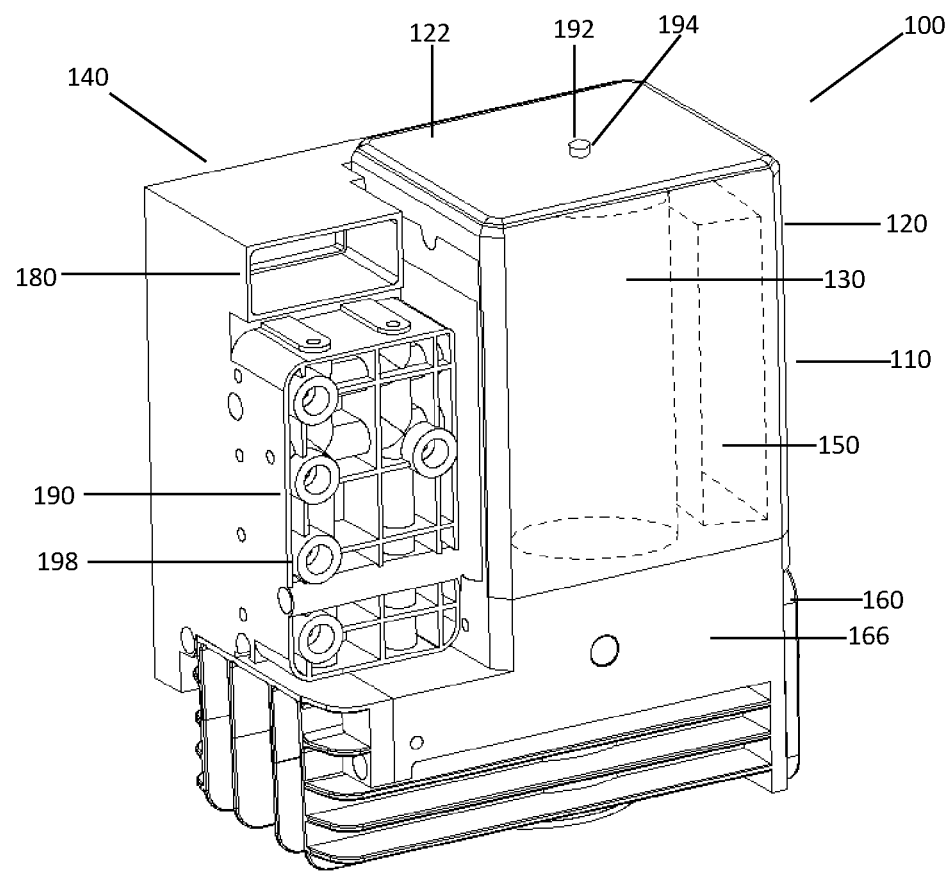
FIG. 1 is a perspective view of a compressed air control device for a source of compressed air on motor vehicles according to one exemplary embodiment.
Figure 2:
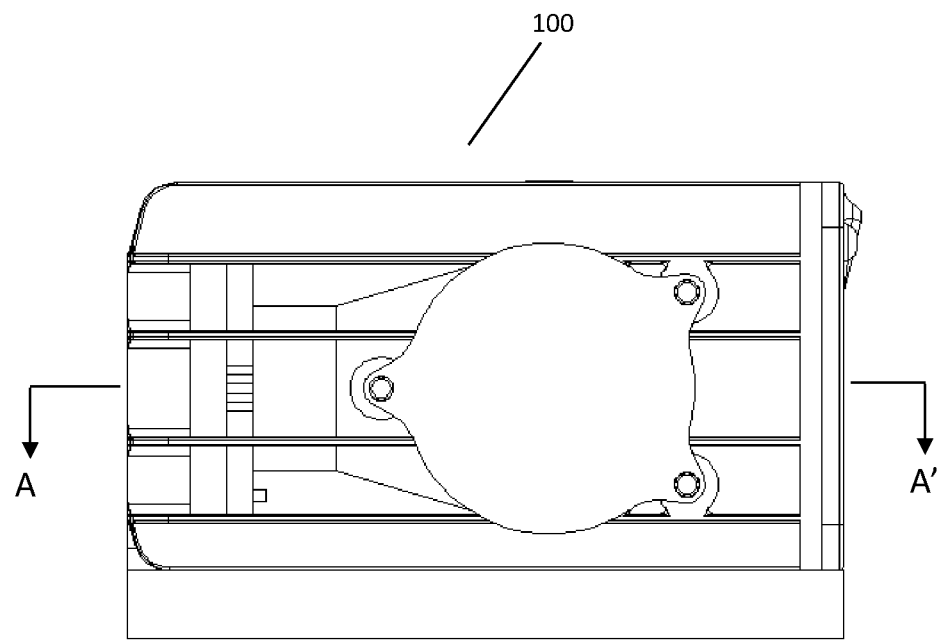
FIG. 2 is a bottom view of the compressed air control device according to one exemplary embodiment.

Referring first to FIGS. 1 and 2, a compressed air control device 100 for a source of compressed air on motor vehicles comprises a housing 120. The housing 120 may have an electric motor 130 and a gas dryer 150. The housing 120 may include an air inlet 192 with an opening 194 located at an outside surface 122 of the housing 120. The air dryer 150, together with the electric motor 130, forms a first functional unit 110. The housing 120 may help protect the motor 130 and the gas dryer 150 from outside damages, preventing dust from getting into the motor 130 and the gas dryer 150. In one embodiment, the motor may be an electric motor. An electric motor is an electrical machine that converts electrical energy into mechanical energy. Most electric motors operate through the interaction between the motor's magnetic field and electric current in a wire winding to generate force in the form of torque applied on the motor's shaft.

Electric motors may be powered by direct current (DC) sources, such as from batteries, or rectifiers, or by alternating current (AC) sources, such as a power grid, inverters or electrical generators.

Electric motors may be classified by considerations such as power source type, construction, application and type of motion output. They can be powered by AC or DC, be brushed or brushless, single-phase, two-phase, or three-phase, axial or radial flux, and may be air-cooled or liquid-cooled.

The compressed air control device 100 further comprises a crank case 160, wherein the crank case comprises an air compressor 166 (also shown in FIG. 3) inside the crank case 160. The first functional unit 110 is attached to and connected to the crank case 160 which is away from the air inlet opening 194. In one embodiment, the crankcase 160 is the housing that surrounds the air compressor 166.

Further in FIG. 1, the compressed air control device 100 may further comprise a second functional unit 140. The second functional unit 140 may comprise a valve assembly 190 and an electronic control device 180. The valve assembly 190 may comprise a plurality of pneumatic valves 198 (details to be discussed in FIGS. 3-9). In one embodiment, the second functional unit 140 may be removably attached to the crank case 160.

In one embodiment, the electronic control device 180 may comprise an electronic connector, such as solenoid valves 390 (shown in FIG. 4), for example.

Figure 3:
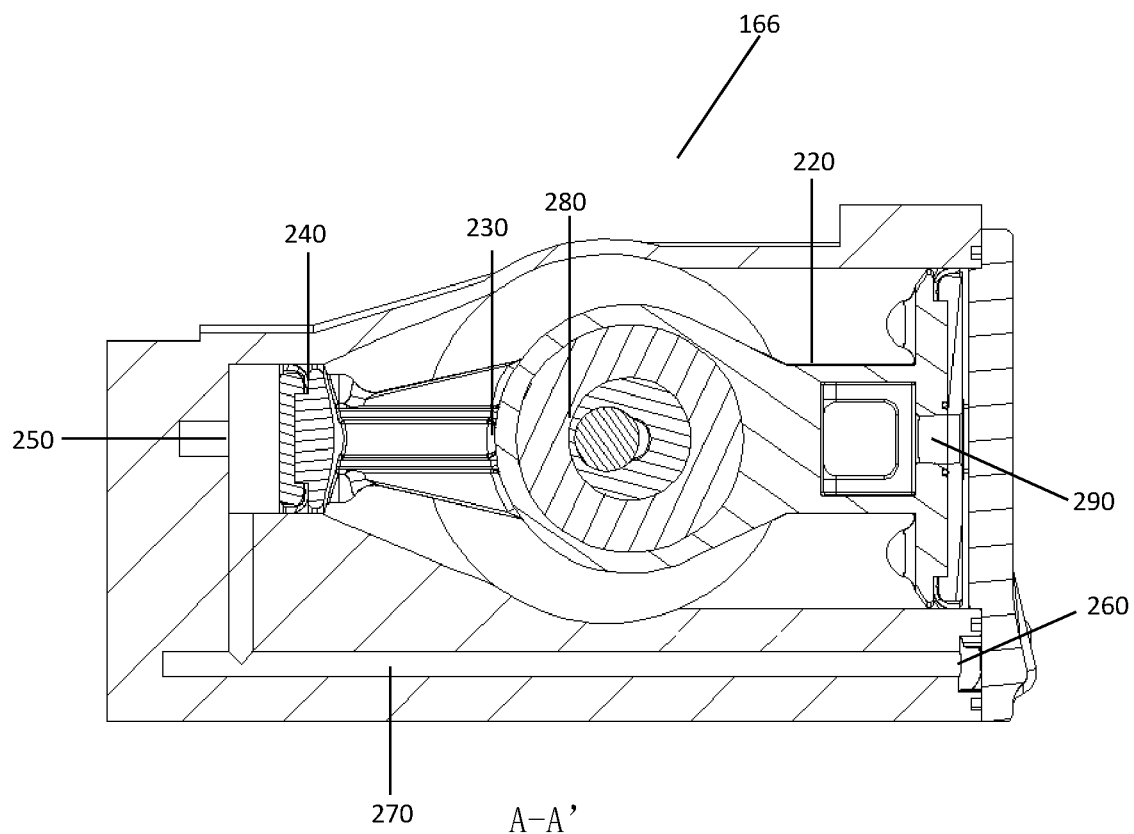
FIG. 3 is a cross-sectional view A-A' of an air compressor in the crank case shown in FIG. 2 according to one exemplary embodiment.

As shown in FIG. 3, the air compressor 166 may be a three-cylinder star compressor, for example. The air compressor 166 may be driven by way of the electric motor 130. In one embodiment, the air compressor 166 is embodied as a two-piston compressor, wherein the pistons are mounted centrally on a crankpin 280. As a consequence, small torque fluctuations and a smaller startup torque likewise occur with the consequence of a quiet compressor operation.

The motor mounting arrangement is likewise loaded to a lesser extent as a result of being mounted on a crankpin 280, as a consequence of which it is possible to dimension said motor mounting arrangement as smaller. The smaller compressor volumes of the cylinders of the two-piston compressor lead to smaller amounts of heat that can be dissipated in a simpler manner. These advantages likewise produce a longer serviceable life and improved activation limes with the consequence of a higher and longer-lasting performance of the integrated air supply unit.

The first piston head 290 connects to the first stage linkage or piston 220. The second piston head 240 may connect to the second stage linkage or piston 230. The first stage linkage or piston 220 may have a bigger diameter than the one for the second stage linkage or piston 230. The cylinder corresponding to the first stage linkage or piston 220 is bigger than the one corresponding to the second linkage or piston 230. Air is supplied from the environment by means of the air inlet 192 by way of the opening 194 at the outside surface 122 of the housing 110 to the air compressor 166. Consequently, it is possible to connect a multi-stage compressor concept. The inlet valve 210 that is connected to a cylinder of the first stage compression is one-way valve. The air outlet valve 260 that is connected to a cylinder of the first stage compression may also be one-way or non-return valve. A compressed air conduit 270 may be connected to the air outlet valve 260 to an air inlet valve 250 for the second stage compression.

Figure 4:
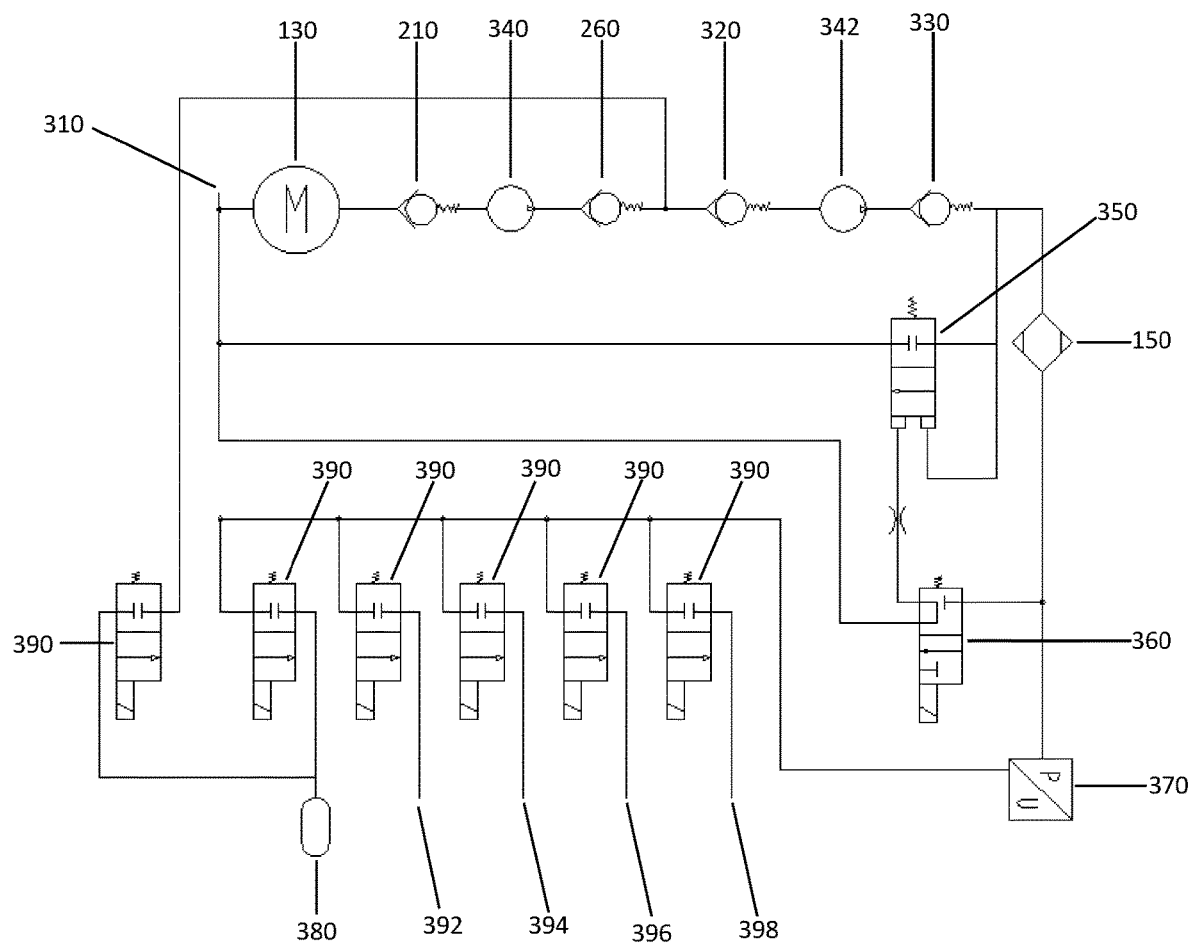
FIG. 4 illustrates a pneumatic circuit diagram of an air suspension system according to one embodiment.

As shown in FIG. 4, atmospheric air 310 can be further guided through the electric motor 130 to an air inlet valve 210 to the first stage air compression 340. After first stage air compression 340, the pressured air may be guided to the air outlet valve 260. The compressed air is further guided to air inlet valve 320 to the second stage air compression 342 for a second compression. The further compressed air may be guided to air outlet valve 330 and either to the air dryer 150 or to the air outlet valve 350. The air outlet valve 250 may be a pneumatic valve. The dried compressed air from the air dryer 150 may be guided either to an air outlet valve 360 or air outlet valve 390 to air springs 392, 294, 396, 398 and a compressed air container 380. The air outlets 360 and 390 may be electro-magnetic valves, such as solenoid valves, for example. A pressure sensor 370 may be used to monitor the pressure of the compressed air after the air dryer 150. The air outlet valve 360 may be connected to the atmospheric air 310. The compressed air container 380 may also be connected to the air outlet solenoid valve 390.

Figure 5:
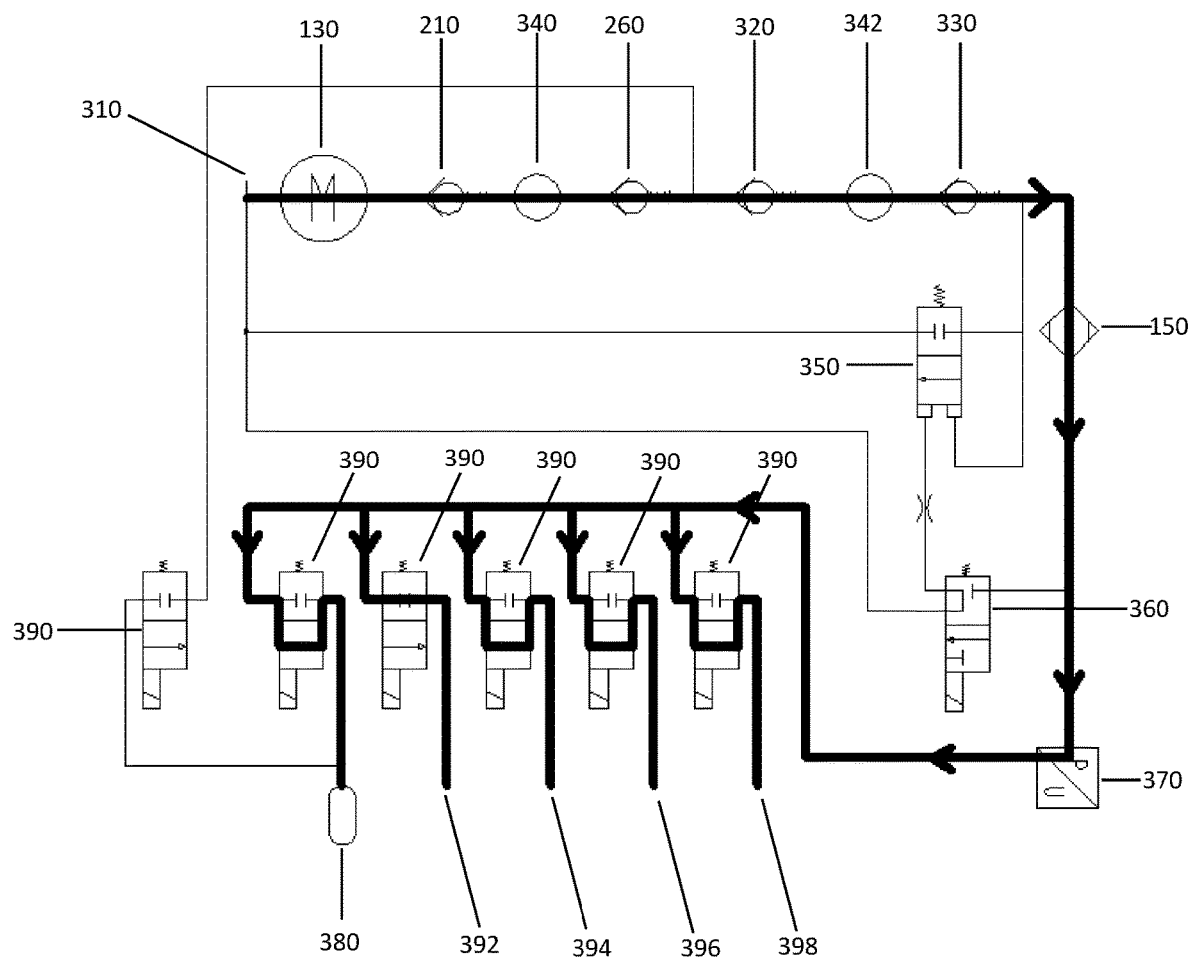
FIG. 5 illustrates a pneumatic circuit diagram of an air suspension system with arrows according to an air inflated embodiment.

FIG. 5 highlights an air inflated pneumatic circuit diagrams with arrows. The method may further comprise steps of pressuring or pumping the dried pressured gas to a pressured container 380 for storage as shown arrows. Additionally, the air flows from the atmosphere 310 to the air springs 392, 394, 396, and 398 as discussed previously.

Figure 6:
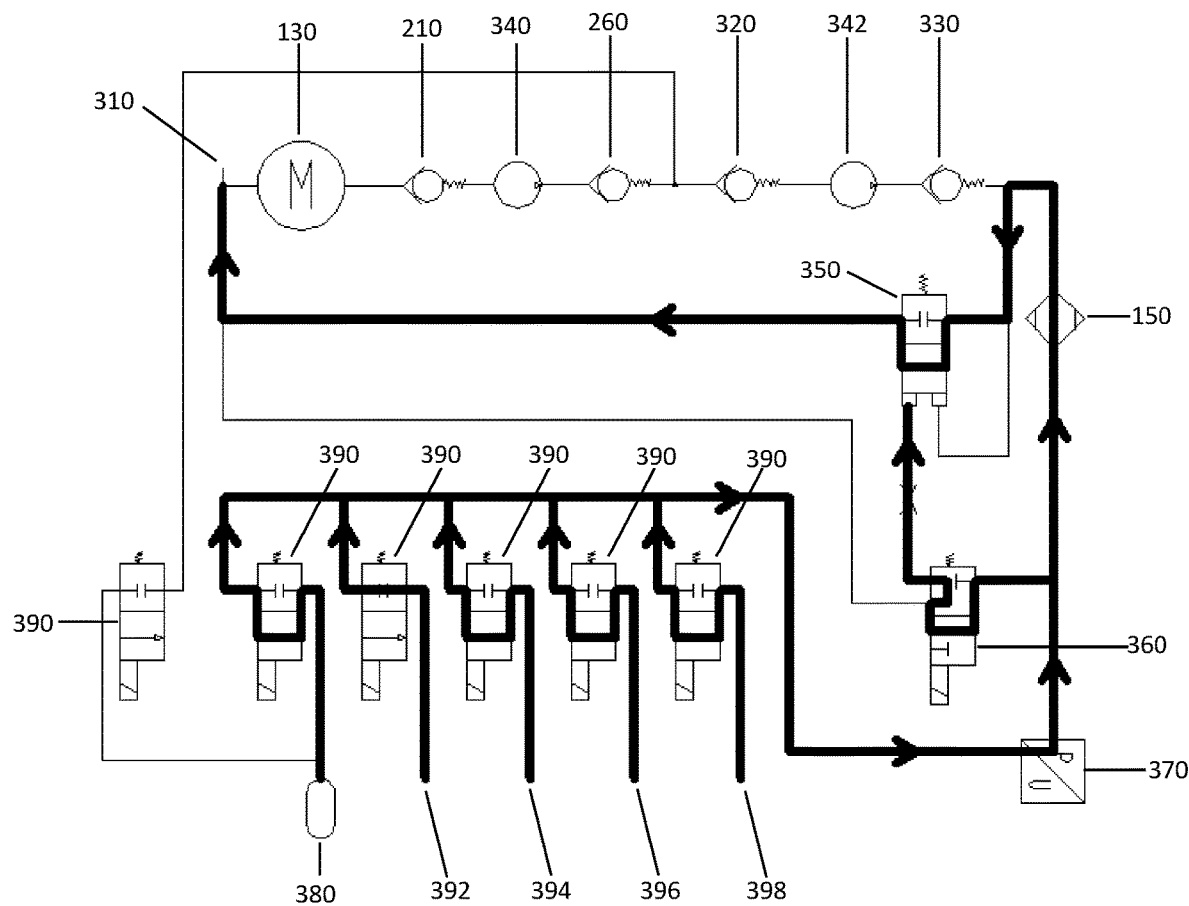
FIG. 6 illustrates a pneumatic circuit diagram of an air suspension system with arrows according to an air deflated embodiment.

As shown FIG. 6, air is discharged through the gas container 380 and the air springs 392, 394, 396, and 398 to the atmosphere via the air outlet 360 or 350.

Figure 7:
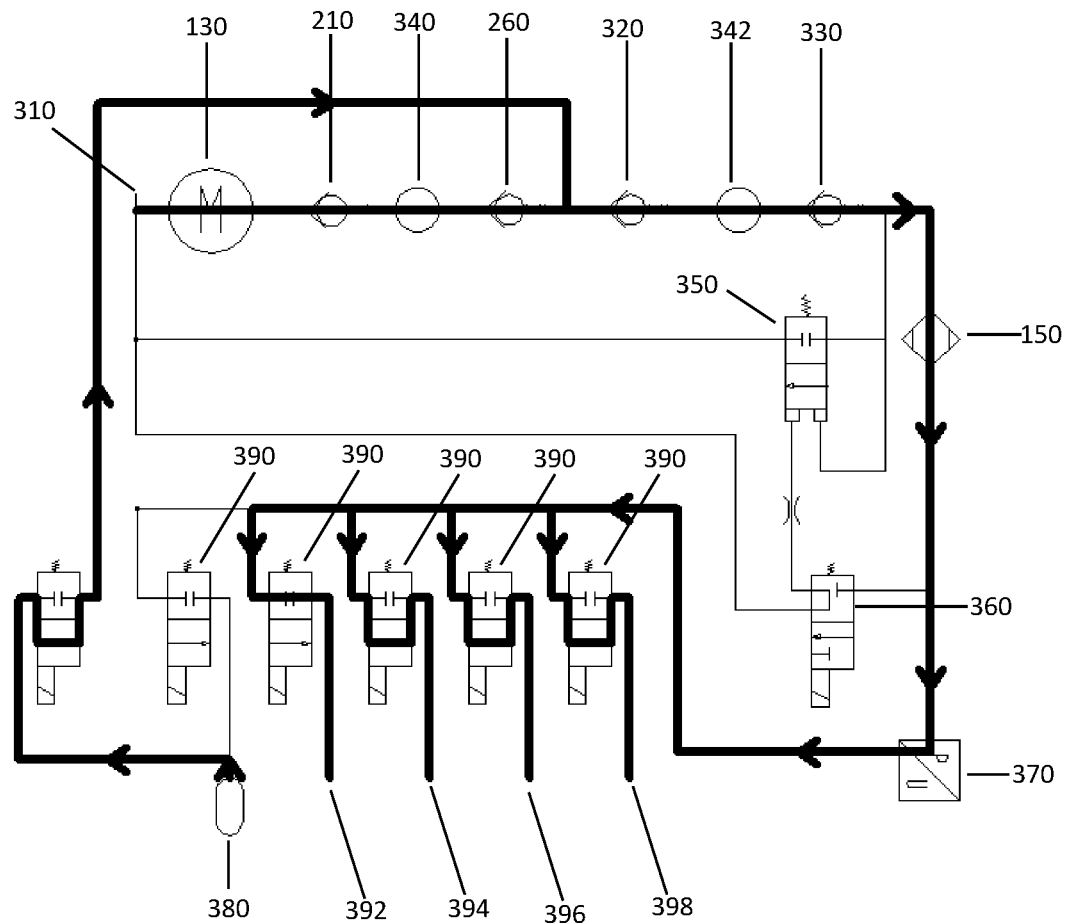
FIG. 7 illustrates a pneumatic circuit diagram with a boost according to one exemplary embodiment.

As shown in FIG. 7, in another embodiment, exemplary method for designing a more efficient reciprocating piston compressor may comprise steps of a) providing an air compressor 166 (shown in FIG. 3) having a first compression stage 340 adapted for compressing gas such as atmosphere gas 310, for example, from a low pressure to an intermediate pressure and including a first piston connected to reciprocate in a first cylinder, a second compression stage adapted for compressing gas from the intermediate pressure to a higher pressure and including a second piston connected to reciprocate in a second cylinder, and a motor connected to reciprocate said first piston in said first cylinder over a stroke and said second piston in said second cylinder over a stroke; and b) establishing a sufficiently fewer number of strokes over which the gas to be pressured starting from the atmosphere pressure.

Further as shown in FIG. 7, the method may further comprise pumping gas from the pressured container 380 to the second compression stage 342 via the air inlet valve 320 to give a boost to the air pressing process so that there will be higher pressure gas out of the second stage compression 342.

Figure 8:
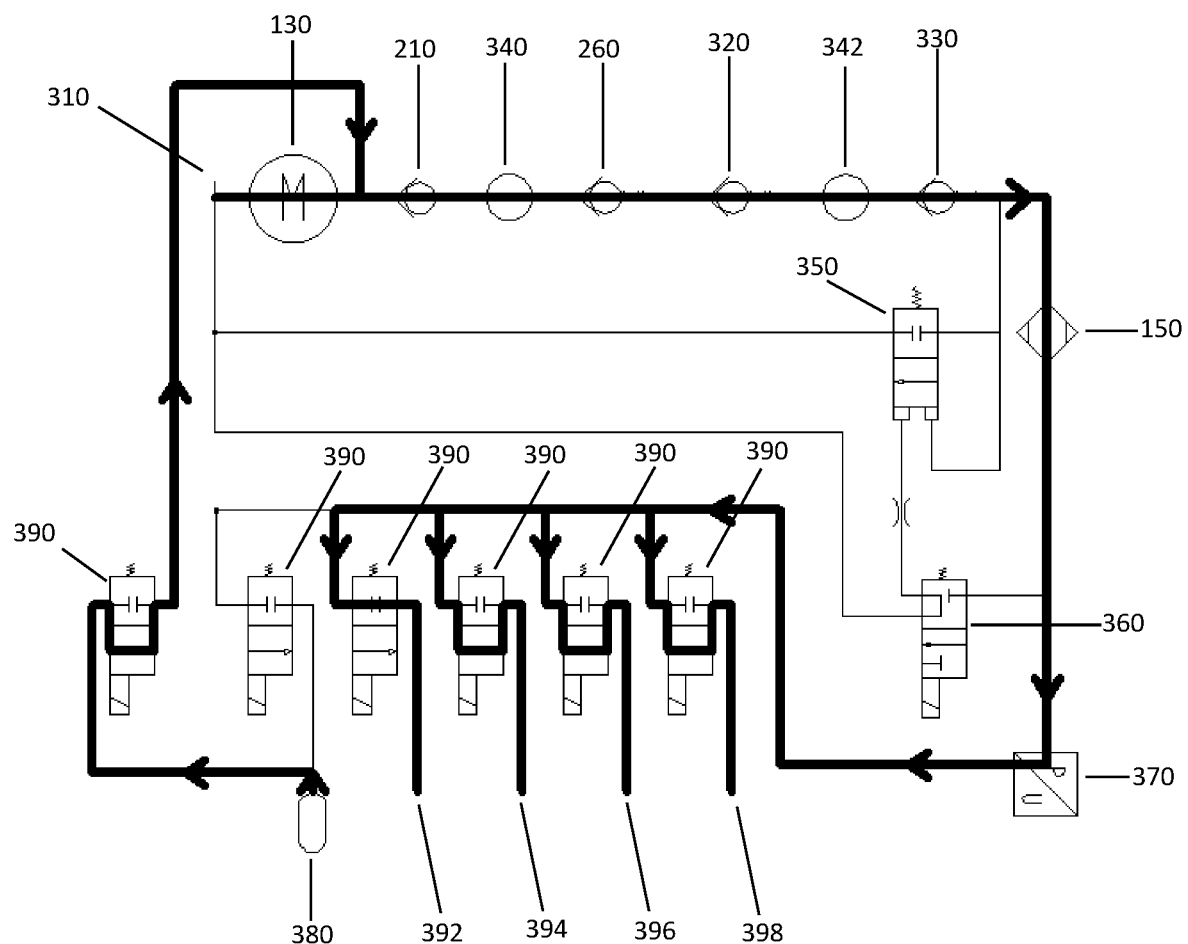
FIG. 8 illustrates a pneumatic circuit diagram with a boost according to another exemplary embodiment.

As shown in FIG. 8, the method may further comprise pumping gas from a pressured container 380 to the first compression stage 340 via the air inlet valve 210 to give a boost to the air pressing process so that there will be higher pressure gas out of the first stage compression 340. Since there is a valve (not shown) through the electric motor 210 that is one-way or non-return valve, so the gas from the pressured container 380 will not escape to the atmosphere. Instead, the gas pumped from the pressured container 380 may mix with atmosphere air and will be guided into the air inlet valve 210.

Figure 9:
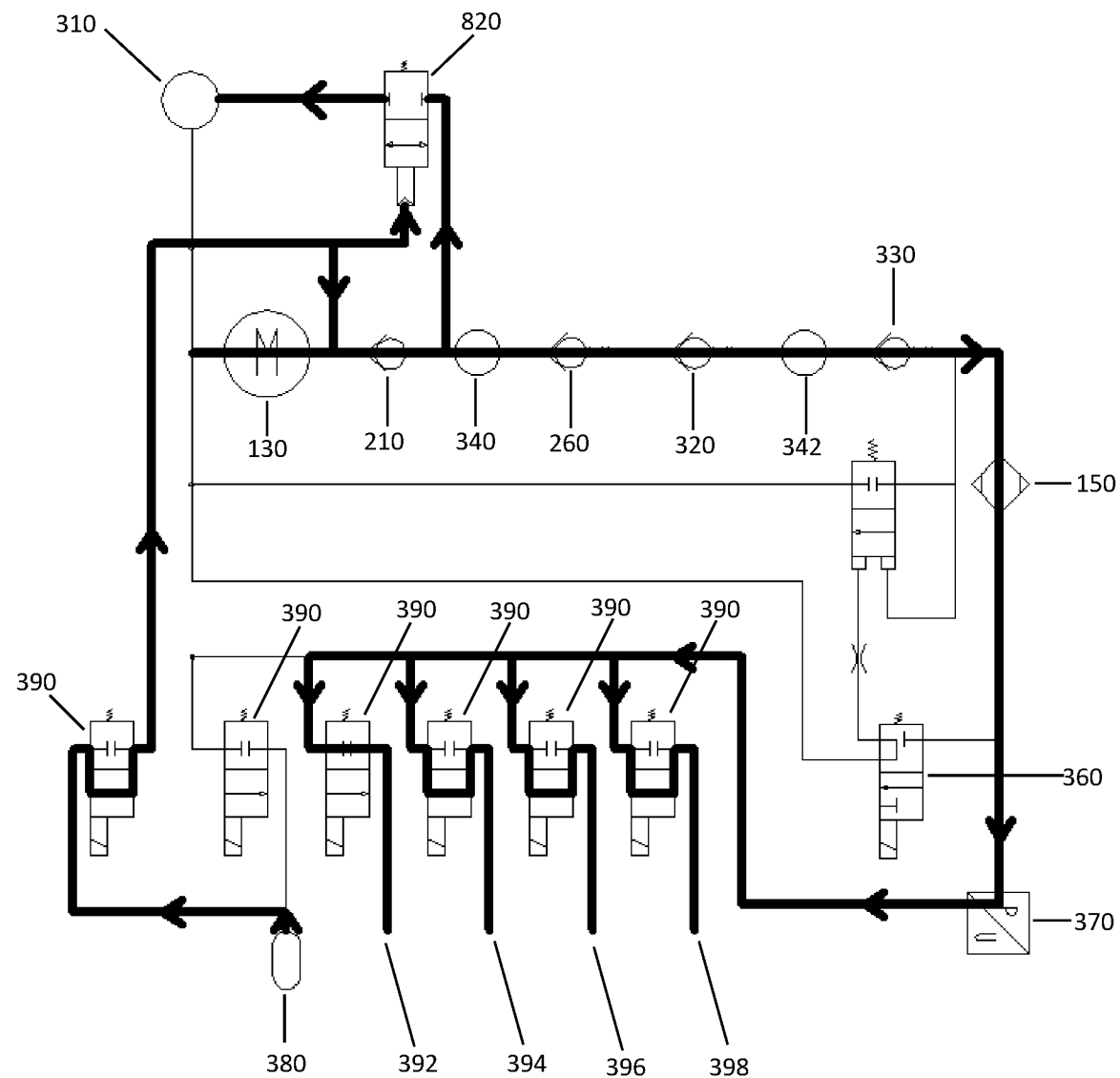
FIG. 9 illustrates a pneumatic circuit diagram with a boost according to yet another exemplary embodiment.

As shown in FIG. 9, the method may further comprise steps of diverting a part of the gas pumped from the pressured container 380 to atmosphere via an electro-magnetic valve 820 if the pressure is higher than a set pressure or pre-determined pressure. In another embodiment, the method may further comprise steps of diverting a part of the pressured gas before going to the first compression stage 340 and instead to atmosphere via the air inlet valve 210 and the electro-magnetic valve 820, for example.

Still in FIG. 9, the method further comprises step of transferring to air springs of a suspension system of a vehicle. Furthermore, the method may further comprise step of regulating the dried pressured gas by an electro-magnetic valve, such as a solenoid valve, before transferring to the air spring.

The main components of an air supply for air suspension systems comprising air compressors, valves and a control device are usually housed separately in the vehicle decoupled from one another as far as vibration technology is concerned. The components are connected by way of dedicated pneumatic and electrical lines that save little space, which leads to a high application expenditure and to high costs.

When supplying the air to air suspension systems for motor vehicles, 1 stage compressor concepts having linear pistons are usually used as compressors. Such compressors are mostly driven by way of an electric motor and comprise a crank case embodied from a synthetic material or die-cast aluminum, a cylinder having a cylinder head embodied from a die-cast aluminum and an air dryer embodied from synthetic material. In addition, one or multiple valves, for example inlet valves or outlet valves, are attached to the cylinder head. The motor control of the electric motor is generally controlled by way of mechanical relays and is not installed on the compressor, which in turn leads to additional lines. Current invention embodiment would overcome the shortcomings of the prior art.

The housing of the electronic control device is preferably produced from a synthetic material and includes in particular an electronic connection to the vehicle electrical system. This is advantageously plugged in a sealed manner onto the crank case so as to provide protection against environmental influences.

The electronic connector on the control device is used for all required signal lines and also for the entire current supply as a consequence of which the assembly expenditure and application expenditure are clearly reduced.

The motor control of the electric motor is now integrated into the air supply and occurs by way of semiconductor switches. Furthermore, the control device can also perform the usual tasks of air suspension systems such as level control and shock absorption control.

The internal electronic connections of the control device to the other components preferably occur by way of plug connections or press fit connections and are consequently not sensitive to interference. The magnetic valve coils are connected to the electronic end stages of the control device using short connecting contacts, as a result of which possible interferences are reduced. Consequently, the electromagnetic compatibility is improved. The short connections have the consequence that voltage drops across the lines are minimized and the power output of the magnetic valves increases. As a consequence, short and non-sensitive regulating circuits are used, as a result of which, in addition to push and hold controls, it is also possible to control the current controls, such as to produce a ramp profile. The magnetic valves can be used with higher, operationally more reliable push currents, as a result of which the construction volumes of the magnetic valves can be reduced.

A diagnostic function can be reliably produced for the motor control by means of the integrated air supply and operational data such as for example the "Operate compressor: yes/no" can be stored and evaluated. Owing to the fact that the otherwise usual electrical lines are omitted, the entire diagnosis behavior and failsafe behavior are improved. Interfering influences can be ruled out by means of the direct connection between the compressor, the magnetic valve block and the control device. All the connections and functions within the air supply unit can consequently be monitored.

The integrated air supply unit is preferably used in air suspension systems for motor vehicles having the concept of a closed air supply. In the case of this air suspension system, the components include air compressors having an electric motor, air dryers, pneumatic valves and pneumatic connectors and also an electronic control device.

This air suspension system comprises an electronically controllable switching valve device that comprises four 2/2 directional control valves.

The valves that can be switched independently of one another are installed in the switching valve device in such a manner that the pressure difference is always in one direction and the higher pressure closes the valves. By virtue of the fact that it is not necessary for the resilient force to keep the seal seat closed against the pressure, resilient elements having smaller resilient forces can be installed, which in turn renders possible smaller valves and coils.

Various operating states are achieved for the air suspension system by means of the switching valve device.

The air suspension systems are filled from the pressure storage device without using the compressor when operating the closed air supply. All four switching valves are opened and the air suspension system is filled rapidly by means of the large cross section that is available. Likewise, the air suspension system is rapidly emptied back into the pressure storage device by way of all four opened switching valves.

In accordance with a further preferred embodiment, the switching valve device comprises four pilot-controlled 2/2 directional control valves.

These valves have the advantage of making large pneumatic powers switchable since the power is dependent upon pressure and volume current. The valves behave differently in dependence upon the through-flow direction or pressure difference. Opening holding pressures and closing holding pressures and also opening cross sections can thus be designed as needed. The overall usability is increased by means of using these valves. In addition, the installation volume can be considerably reduced with respect to known embodiments.

It will be appreciated by persons skilled in the art that numerous variations and/or modifications may be made to the invention as shown in the specific embodiments without departing from the scope of the invention as broadly described. The present embodiments are, therefore, to be considered in all respects as illustrative and not restrictive.

The above shows and describes the basic principles, main features and advantages of the patent application. Those skilled in the industry should understand that the present patent application is not limited by the above-mentioned embodiments. The above-mentioned embodiments and the description are only preferred examples of the present patent application and are not intended to limit the present patent application, without departing from the present utility patent application. Under the premise of spirit and scope, the present utility patent application will have various changes and improvements, and these changes and improvements fall within the scope of the claimed utility patent application. The scope of protection claimed by the utility patent application is defined by the appended claims and their equivalents.

We claim:

1. A compressed air control device for a source of compressed air on motor vehicles, comprising:
   a crank case comprising a two stage air compressor;
   a first functional physical unit comprising an electric motor and an air dryer disposed in a first housing with the air dryer directly adjacent to the electric motor, wherein the electric motor is configured to drive the two stage air compresso and the electric motor has a first central longitudinal axis and the air dryer has a second central longitudinal axis which is parallel to the first longitudinal axis of the electric motor;
   a second functional physical unit comprising a valve assembly and an electronic control device disposed in a second housing;
   a compressed air container;
   wherein the first functional physical unit is removably attached to the second functional physical unit and the crank case,
   wherein the valve assembly comprises a first control valve and a second control valve, the first control valve configured to control air flow in a line from an outlet of a second stage of the two stage air compressor to the compressed air container, and the second control valve configured to control air flow from the compressed air container to an inlet of the second stage of the two stage compressor, the inlet disposed in an air passage between a first stage and the second stage of the two stage air compressor.

2. The compressed air control device of claim 1, wherein the second functional physical unit is removably attached to the crank case.

3. The compressed air control device of claim 1, wherein the first functional physical unit situates between the crank case and an air inlet opening of a first stage of the two stage air compressor.

4. The compressed air control device of claim 1, wherein the valve assembly comprises a plurality of pneumatic valves.

5. The compressed air control device of claim 1, wherein the two stage air compressor is embodied as a two-piston compressor.

6. The compressed air control device of claim 5, wherein the two-piston compressor is mounted centrally in regard to and by way of a crankpin.

7. The compressed air control device of claim 1, wherein the electronic control device comprises an electronic connector.

8. The compressed air control device of claim 1, wherein the compressed air control device is assembled to the motor vehicle.

9. A compressed air control device for a source of compressed air on motor vehicles, comprising:
- a first housing including an air inlet located at an outside surface of the first housing, wherein the interior of the first housing includes:
- an electric motor, wherein the electric motor has a first central longitudinal axis; and
- an air dryer directly adjacent to the electric motor, wherein the air dryer has a second central longitudinal axis, which is parallel to the first central longitudinal axis of the electric motor, wherein the first housing, the air dryer, and the electric motor together forms a first functional physical unit;
- a second housing including a valve assembly and an electronic control device, the second housing, the valve assembly, and the electronic control device together forming a second physical functional unit;
- a crank case, wherein the crank case comprises a multi stage air compressor having opposing pistons of different diameters driven by the electric motor, the opposing pistons reciprocating in associated opposing cylinders to produce first and second stages of the multi stage air compressor, wherein the first and second housings are attached to and connected to the crank case.

10. The compressed air control device of claim 9, wherein the first and second opposing pistons are mounted centrally in regard to and by way of a crankpin.

* * * * *